(12) United States Patent
Williams

(10) Patent No.: US 7,650,867 B2
(45) Date of Patent: Jan. 26, 2010

(54) INTAKE AND EXHAUST TUNING SYSTEM

(76) Inventor: Allan R. Williams, 959 Daley St., Edmonds, WA (US) 98020

( * ) Notice: Subject to any disclaimer, the term of this patent is extended or adjusted under 35 U.S.C. 154(b) by 301 days.

(21) Appl. No.: 11/382,910

(22) Filed: May 11, 2006

(65) Prior Publication Data

US 2007/0261398 A1    Nov. 15, 2007

(51) Int. Cl.
*F02M 35/12* (2006.01)
(52) U.S. Cl. .................................. 123/184.55
(58) Field of Classification Search ............ 123/184.21, 123/184.53, 184.55, 184.56
See application file for complete search history.

(56) References Cited

U.S. PATENT DOCUMENTS

| | | | |
|---|---|---|---|
| 1,130,358 A | 3/1915 | Whitney | |
| 2,102,559 A | 12/1937 | Kadenacy | |
| 3,703,937 A | 11/1972 | Tenney | |
| 3,726,092 A | 4/1973 | Raczuk | |
| 3,897,073 A | 7/1975 | Swanson et al. | |
| 4,747,624 A | 5/1988 | Faber et al. | |
| 5,009,455 A | 4/1991 | Irvine et al. | |
| 5,048,470 A | 9/1991 | Geddes et al. | |
| 5,050,378 A | 9/1991 | Glemmens | |
| 5,271,224 A | 12/1993 | Cruickshank | |
| 5,323,813 A | 6/1994 | Barrett | |
| 5,579,638 A | 12/1996 | Archer | |
| 5,628,287 A * | 5/1997 | Brackett et al. | 123/184.55 |
| 5,740,770 A * | 4/1998 | Morota | 123/184.55 |
| 5,785,014 A | 7/1998 | Cornwell | |
| 5,865,971 A | 2/1999 | Sunkara | |
| 6,047,677 A * | 4/2000 | Kim | 123/184.55 |
| 6,141,958 A | 11/2000 | Voss | |
| 6,408,810 B1 * | 6/2002 | Leipelt et al. | 123/184.55 |
| 6,460,501 B1 * | 10/2002 | Fischer et al. | 123/184.55 |
| 6,539,923 B1 * | 4/2003 | Mengoli | 123/472 |
| 6,553,955 B1 | 4/2003 | Hada et al. | |
| 6,837,204 B1 * | 1/2005 | Stuart | 123/184.55 |
| 6,983,727 B2 * | 1/2006 | Narayanaswamy | 123/184.55 |
| 7,389,758 B2 * | 6/2008 | Yokoi | 123/184.55 |
| 2003/0136120 A1 | 7/2003 | Piekarski | |
| 2009/0084336 A1 * | 4/2009 | Friedl | 123/184.55 |

OTHER PUBLICATIONS

"Wave-Dynamics Analysis", Dynomation Engine Simulation, Professional Wave-Action Simulation, v. 4.20, pp. 231-244, Feb. 1, 2005.

* cited by examiner

*Primary Examiner*—Hai H Huynh
(74) *Attorney, Agent, or Firm*—Black Lowe & Graham, PLLC

(57) ABSTRACT

An intake and exhaust tuning system is disclosed. The exhaust system includes a collector slidably mounted within the exhaust fluid path and adjustable by an actuator to change the fluid path length between the collector and the exhaust ports of an engine. The intake tuning system includes a sliding member engaging parallel straight sections of tubes forming the intake system. The position of the sliding member is adjusted to change the length of the intake fluid path. Sealing members suitable for use in the intake and exhaust tuning systems are also disclosed.

3 Claims, 16 Drawing Sheets

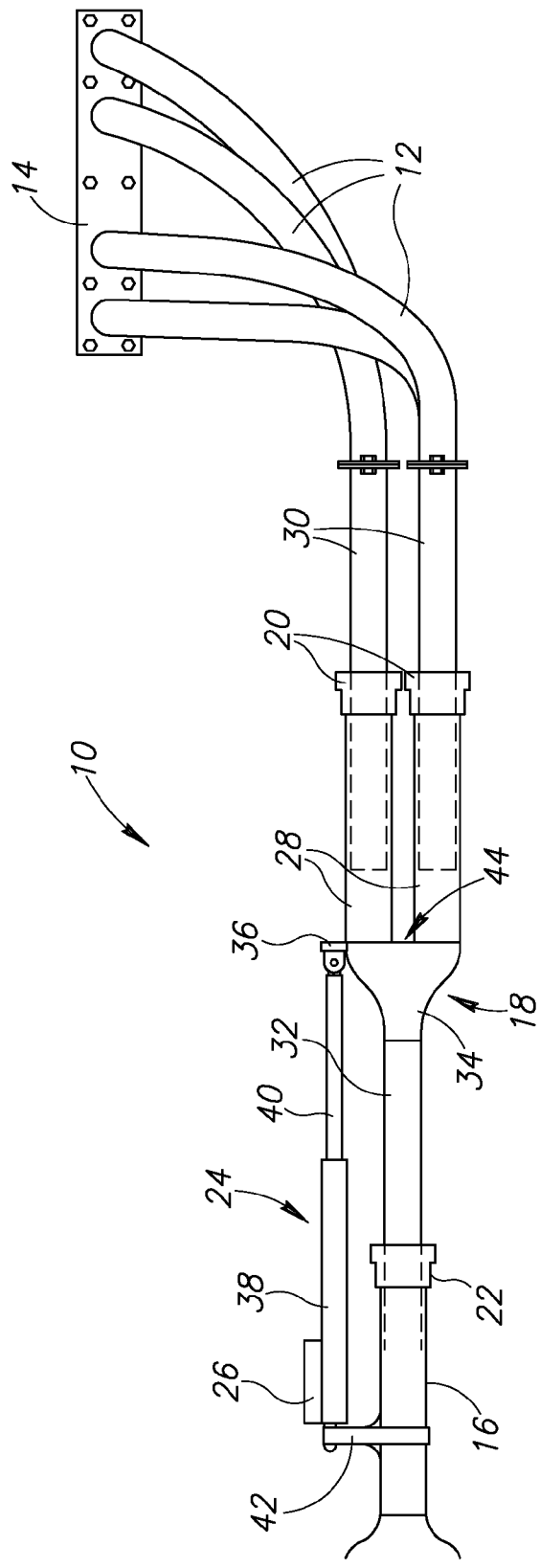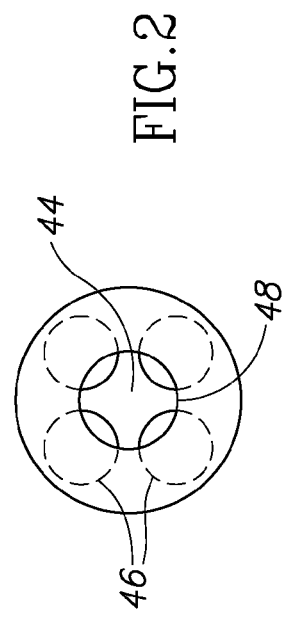

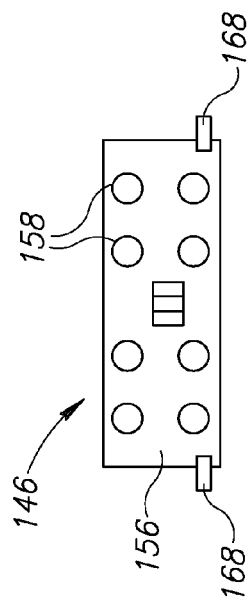
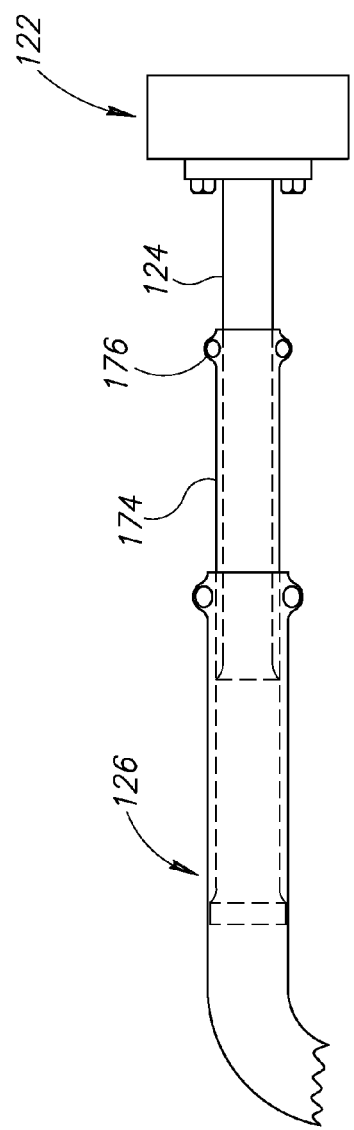

INTAKE AND EXHAUST TUNING SYSTEM

FIELD OF THE INVENTION

This invention relates generally to internal combustion engines and, more specifically, to intake and exhaust systems for such engines.

BACKGROUND OF THE INVENTION

Power output and efficiency of internal combustion engines can be improved by tuning the properties of the intake and exhaust systems to take advantage of pressure waves propagating from the engine cylinders. In the exhaust system of a typical engine, exhaust gases are released into the exhaust system from the engine cylinder at high pressure. The resulting pressure wave travels at the speed of sound through the exhaust system. Part of the energy of the pressure wave is reflected back toward the cylinder in the form of a negative pressure wave when the pressure wave passes points where the air channel increases sharply in diameter. This typically occurs at a collector where exhaust pipes from the individual cylinders converge. In the intake system, the sudden intake of air during the intake stroke in four-stroke engines results in a negative wave, a portion of which is reflected toward the cylinder as a pressure wave by openings or dilations in the intake system.

If the return waves arrive at the cylinder at the appropriate time, they aid in the flow of gases in and out of the cylinder. If the exhaust system return wave arrives while the exhaust valve is still open, the negative pressure will help draw exhaust gases out of the cylinder. If the return wave strikes the exhaust port when both the exhaust valve and intake valve are open, the negative pressure aids in drawing a fresh charge of air and fuel into the cylinder. The return wave in the intake system aids in forcing the charge of air and fuel into the cylinder.

The return waves in the intake and exhaust system must be timed correctly in order to arrive at the intake and exhaust ports, respectively, at the appropriate times. In most engines, the air columns in the intake and exhaust systems are fixed. Since the speed of the return waves is substantially constant, the timing of the return waves is also constant. The engine therefore benefits from the return waves only for a small range of operating speeds where the opening of the exhaust and intake ports coincides with the return waves.

Some systems allow for manual adjustment of the length of the air column in the exhaust system in order to adjust engine operating speeds benefiting from the return wave. However, none of the prior systems provides a suitable means for accommodating the full range of operating speeds of the engine.

Accordingly, it would be an advancement in the art to provide a system and method for adapting the acoustic properties of an intake and exhaust systems according to the operating speed of the engine.

SUMMARY OF THE INVENTION

The present invention provides a system for tuning an intake and an exhaust system of an engine. The exhaust tuning system includes a plurality of upstream pipes connected to the exhaust ports of an engine and a downstream pipe. In one example of the invention, the upstream pipes and downstream pipe adjustably connect to a collector to create a fluid path. An actuator couples to the collector to adjust the collector position and vary the fluid path length from the exhaust ports to the collector. An engine control unit (ECU) is coupled to an engine speed sensor and adjusts the collector position in response to changes in the operating speed of the engine.

The collector may include a plurality of inlet tubes overlapping with the upstream tubes. An outlet tube secures to the collector and overlaps with the downstream tube. Sealing members maintain a sliding seal between the inlet tubes and the upstream tubes and between the outlet tube and the downstream tube. The sealing members engaging the inlet tubes may be offset from one another along a longitudinal direction corresponding to a direction of fluid flow within the inlet tubes.

An intake tuning system includes an upstream tube and a downstream tube. The downstream tube connects to the intake ports of an engine. A sliding tube slidably connects to the upstream tube and downstream tube. The upstream tube and downstream tube each include a straight portion oriented parallel to one another. The sliding tube is a U-shaped member and slides along the straight portions. An actuator engages the sliding tube to adjust its position relative to the upstream tube and downstream tube in order to vary the length of the fluid path followed by gases within the intake system. A speed sensor detects the operating speed of the engine provides the output to the ECU. The ECU causes the actuator to adjust the position of the sliding tube in response to sensed changes in the operating speed of the engine.

A sealing member suitable for use in the intake and exhaust system includes a first outer tube section having a first flange extending circumferentially outwardly therefrom and a second outer tube having a second flange extending circumferentially outward therefrom. An inner tube is slidably positioned within the first and second outer tubes sections having the first and second flanges facing one another. A fastener secures the first and second flanges together to capture a compressible seal between the flanges and the inner tube. In one embodiment, the fastener is embodied as first and second rings secured to one another having the first and second flanges positioned therebetween.

BRIEF DESCRIPTION OF THE DRAWINGS

Preferred and alternative embodiments of the present invention are described in detail below with reference to the following drawings.

FIG. 1 is a side elevation view of an exhaust tuning system, in accordance with an embodiment of the present invention;

FIG. 2 is front elevation view of a converging section, in accordance with an embodiment of the present invention;

FIG. 9 is a front elevation view of a tube mounting plate, in accordance with an embodiment of the present invention;

FIG. 10 is a side elevation view of a sliding member for an intake tuning system having a slidable intermediate pipe coupled thereto, in accordance with an embodiment of the present invention;

DETAILED DESCRIPTION OF THE PREFERRED EMBODIMENT

Figure 3:
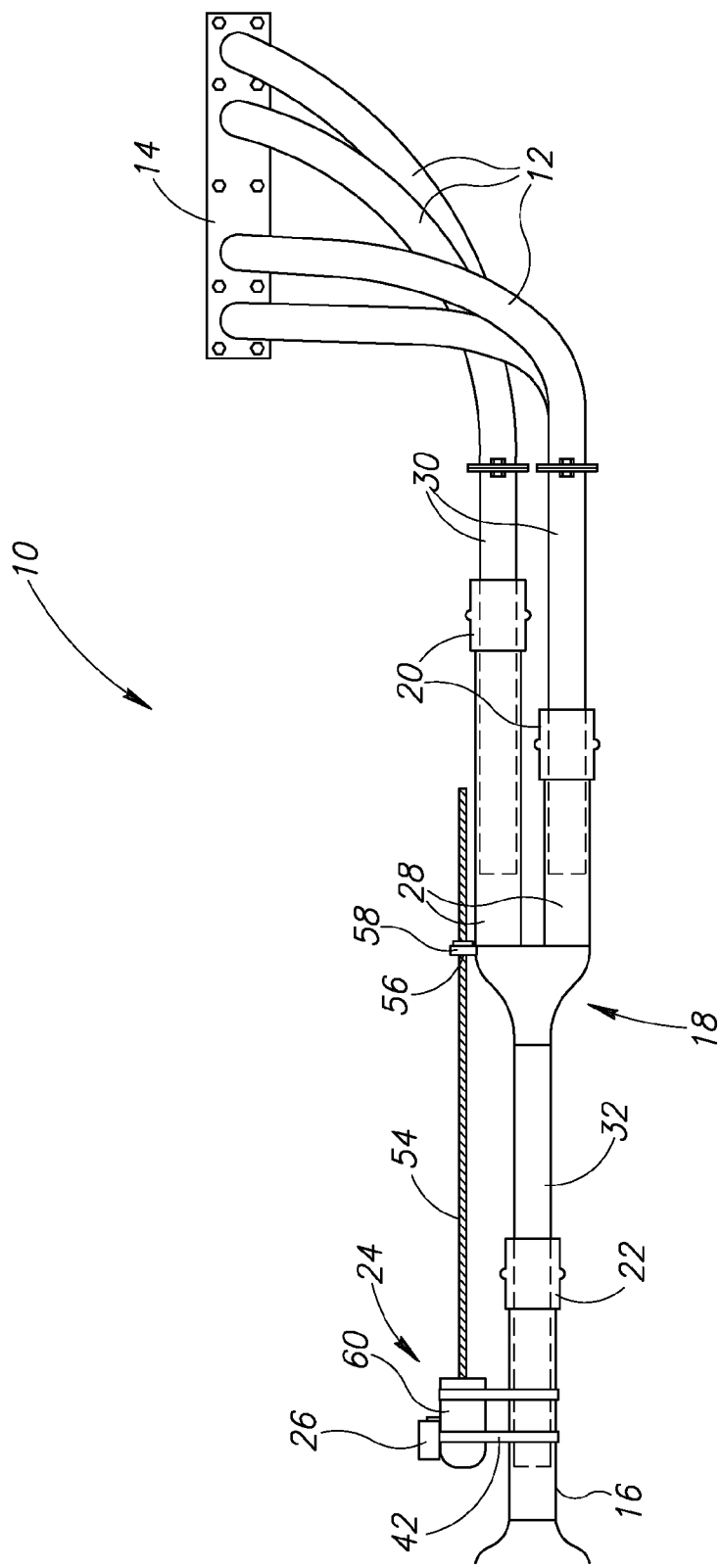
FIG. 3 is a side elevation view of an alternative embodiment of an exhaust tuning system, in accordance with an embodiment of the present invention.

Referring to FIG. 1, an exhaust tuning system 10 includes a plurality of upstream pipes 12 extending from the exhaust ports of an engine 14. A downstream pipe 16 is distanced from the upstream pipes 12 and conducts exhaust gasses to exhaust handling systems such as a catalytic converter and the muffler. A collector 18 extends between the plurality of upstream pipes 12 and the downstream pipe 16 to complete the fluid channel therebetween. The collector 18 slidably connects to the upstream pipes 12 and the downstream pipe 16 to adjust the distance between the exhaust port and the point at which the fluid channels from the individual exhaust ports converge. Seals 20 secure between the upstream pipes 12 and collector 18 and provide a sliding seal therebetween. A seal 22 secures between the downstream pipe 16 and the collector 18.

An actuator 24 engages the collector 18 to change the location of the collector 18 relative to the exhaust ports. A controller 26 may be electrically coupled to the actuator 24 to cause the actuator 24 to move to a desired position. The controller 26 may translate directives regarding a desired location of the collector 18 into a quantity of electrical, hydraulic, pneumatic, or other power supplied to the actuator 24. The actuator 24 may provide feedback to the controller regarding the current location of the collector 18 to enable the controller 26 to meter power supplied to the actuator 24 to achieve an intended change in position.

The collector 18 includes a plurality of inlet tubes 28 overlapping with the upstream pipes 12. The upstream pipes 12 may include a straight portion 30 formed thereon or secured thereto for engaging the inlet tubes 28. The inlet tubes 28 are positioned either inside or outside the upstream pipes 12. The sealing members 20 typically secure to the outermost of the inlet tubes 28 and upstream pipes 12. An outlet tube 32 overlaps with the downstream pipe 16 and is positioned either in- or outside of the downstream pipe 16. The sealing member 22 secures to the outermost of the outlet tube 32 and downstream pipe 16.

A converging section 34, or funnel, couples the inlet tubes 28 to the outlet tube 32. The converging section 34 provides a dilation point within the air column thereby serving to reflect negative pressure waves toward the exhaust ports of the engine. Pressure waves propagating through the upstream pipes 12 will expand into adjacent upstream pipes 12 and the downstream pipe 16 upon reaching the converging section 34. This sudden dilation of the fluid path at the converging section 34 results in a negative pressure wave propagating back up the upstream pipe 12 that originated the pressure wave. The arrangement of the upstream pipes 12, inlet tubes 28, and converging section 34 provide a narrow fluid path up to the dilation point at the converging section 34.

The above described arrangement of upstream pipes 12, inlet tubes 28, and the converging section 34 ensures that the pressure waves from the different cylinders of the engine travel separate fluid paths up to the dilation point at the converging section 34. This avoids dissipation of the pressure wave and negative pressure wave. It further avoids interference between cylinders, enabling more predictable behavior and more precise tuning of the exhaust tuning system 10.

The converging section 34 may include an ear 36, or bracket, extending therefrom to engage the actuator 24. In one embodiment, the actuator 24 is embodied as a ball-screw, hydraulic, or pneumatic, cylinder 38 and piston 40. In the illustrated embodiment, the piston 40 secures to the ear 36 and the cylinder 38 secures to the downstream pipe 16 by means of a bracket 42. Alternatively, the cylinder 38 or piston 40 may secure to one or more of the upstream pipes 12.

Referring to FIG. 2, while still referring to FIG. 1, the converging section 34 may include a front plate 44 secured at the larger end thereof. The front plate 44 has a plurality of inlet apertures 46 receiving the inlet tubes 28. An outlet aperture 48 is formed at the narrow end of the converging section and receives the outlet tube 32. The inlet apertures 46 may be symmetrically positioned on the front plate 44 to provide consistent wave propagation properties for all fluid paths.

Referring to FIG. 3, in one embodiment, the sealing members 20 may be longitudinally offset from one another to accommodate larger sealing structures. In the illustrated embodiment, the sealing members 20 secure to inlet tubes 28 having differing lengths. Each inlet tube 28 may have a unique length or have a length that is different from immediately adjacent tubes 28. In an alternative embodiment, the inlet tubes 28 have substantially equal lengths. In such embodiments, the upstream pipes 12 may have either equal or differing lengths and secure to the sealing members 20 such that the upstream pipes 12 extend outside the inlet tubes 28.

Various embodiments of the actuator 24 are also possible. For example, the actuator 24 may drive a threaded rod 54 engaging a threaded aperture 56 formed in the converging section 34 or formed in an ear 58 secured to the converging section. The actuator 24 may secure to any fixed structure forming the engine or automobile in which the exhaust system is used. The actuator 24 may also secure to the downstream pipe 16, as illustrated, or to the upstream pipes 12. In the embodiment of FIG. 3, the actuator may be embodied as a stepper motor 60 or servo 60. A controller 26 may adjust the location of the collector 18 by causing the stepper motor 60 to rotate the rod 54 a specific number of degrees causing the threaded aperture 56 to translate along the rod 54.

Figure 4:
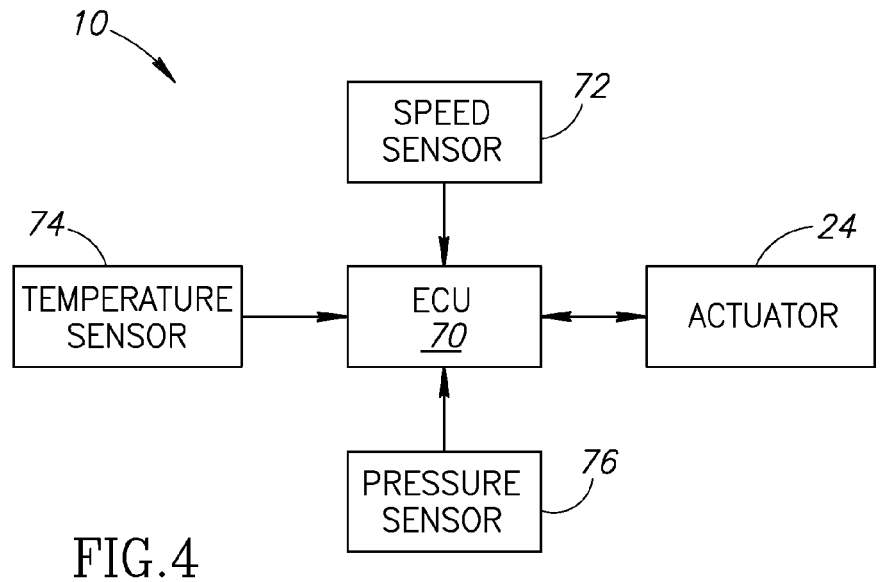
FIG. 4 is a schematic block diagram of an exhaust tuning system, in accordance with an embodiment of the present invention.

Referring to FIG. 4, an exhaust tuning system 10 includes an engine control unit 70. The engine control unit 70 receives inputs from sensor such as an operating speed sensor 72, temperature sensor 74, pressure sensor 76, and the like. The ECU 70 provides an output to the actuator 24, or the controller 26 of the actuator 24. The ECU 70 may also receive feed back from the actuator 24 regarding the current position of the collector 18.

The ECU 70 determines, based on the inputs received, a collector position suitable for coordinating pressure waves within the exhaust system with opening and closing of the exhaust ports. The ECU 70 may monitor the inputs and make substantially constant or regularly periodic adjustments to collector position. Alternatively, the ECU 70 may adjust the collector position only upon detection of a change in one or more of the inputs exceeding a specific threshold. The threshold may be proportional or otherwise related to operating speed or another parameter. The ECU 70 may map collector positions to specific values, or combinations of values, of one or more parameters such as operating speed, exhaust temperature, exhaust pressure and the like. In one embodiment, only operating speed is used. In other embodiments, changes in the speed of the waves due to temperature and pressure changes may be accommodated by mapping collector positions to values for operating speed, temperature, and/or pressure. Some engines may vary the timing of valve opening and closing relative to crankshaft position according to operating speed, load on the engine, and other parameters. Accordingly, the ECU 70 may adjust the collector position to coincide with these variations.

Mapping may be accomplished by various means. In one embodiment, tables map values, or ranges of values, of inputs to the ECU 70 to collector positions. In other embodiments, the ECU 70 accomplishes mapping according to a mathematical formula. In still other embodiments, the ECU 70 accomplishes mapping according to a plurality of mathematical formulae each corresponding to a range of input values for one or more inputs. Mathematical formulae and maps are typically generated by testing of a particular engine to determine which collector position provide the highest performance gains for a particular operating speed.

A formula for calculating collector position is $L=((850*(360-EVO))/RPM)-3$. Where L is the length of the fluid path from the engine 14 to the collector 18, EVO (exhaust valve opening) is the angular position at which the exhaust valve opens, and RPM (revolutions per minute) is the angular velocity of the crankshaft. A collector position achieving the desired length L may then be calculated.

In some embodiments, calculated values for L may be adjusted based on tracking of the exhaust gas pressure at the exhaust port. For example, where tracking of exhaust pressure shows that a return wave is arriving early or late, the ECU 70 may adjust the collector position to lengthen or shorten, respectively, the length L. In still other embodiments, feedback of exhaust gas pressure is the only means used to determine collector position. The ECU 70, for example, may determine whether the return wave is arriving early or late and adjust the collector position to lengthen or shorten, respectively, the length of the fluid path from the engine 14 to the collector. The ECU 70 may sample the arrival time of the return waves and adjust collector position substantially continuously or periodically in order to cause the collector position to track changes in engine operating speed.

Figure 5:
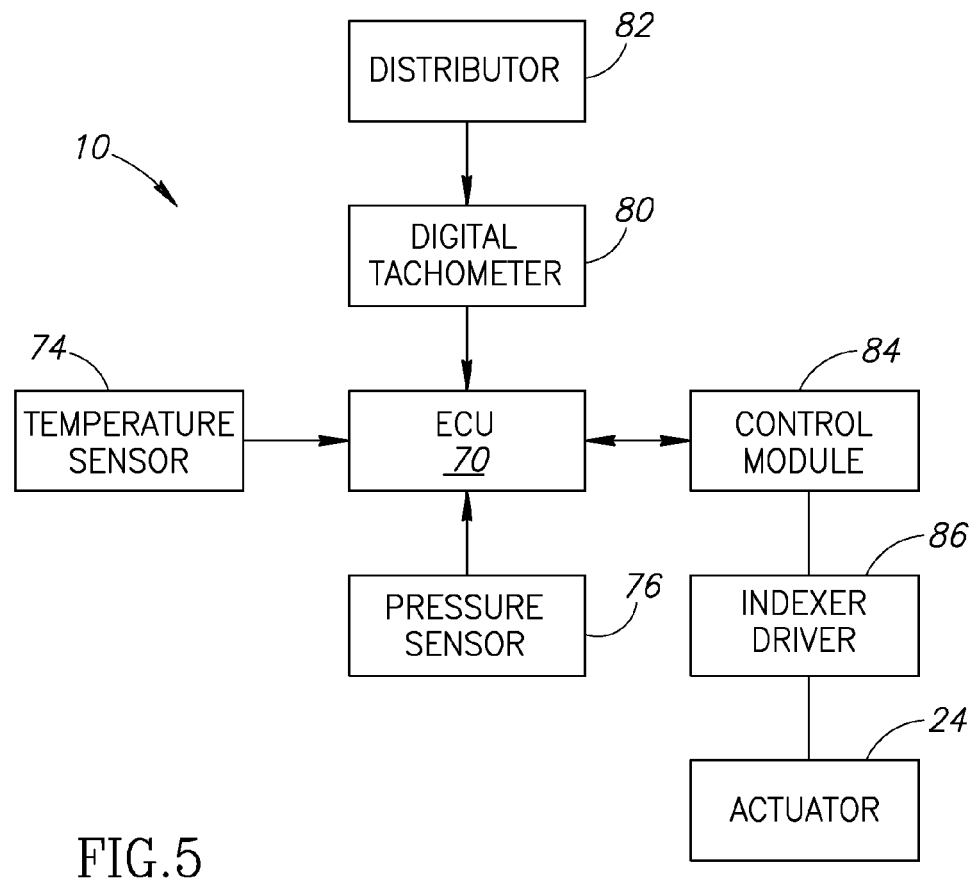
FIG. 5 is a schematic block diagram of an alternative embodiment of an exhaust tuning system, in accordance with an embodiment of the present invention.

Referring to FIG. 5, in an alternative embodiment, the operating speed of the engine is measured by a digital tachometer 80 coupled to the distributor 82 of the engine. The output of the digital tachometer is input to the ECU 70. The ECU 70 calculates a desired fluid path length or collector position as described above. The ECU 70 may provide an output to a control module 84 coupled to an indexer driver 86 driving the actuator 24. The control module 84 refines the output of the ECU 70 to produce an output signal to the indexer driver 86. The control module 84 translates a position, change in position, or fluid path length from the ECU 70 into signals provided to the indexer driver 86 effective to achieve the desired change in position.

Figure 6:
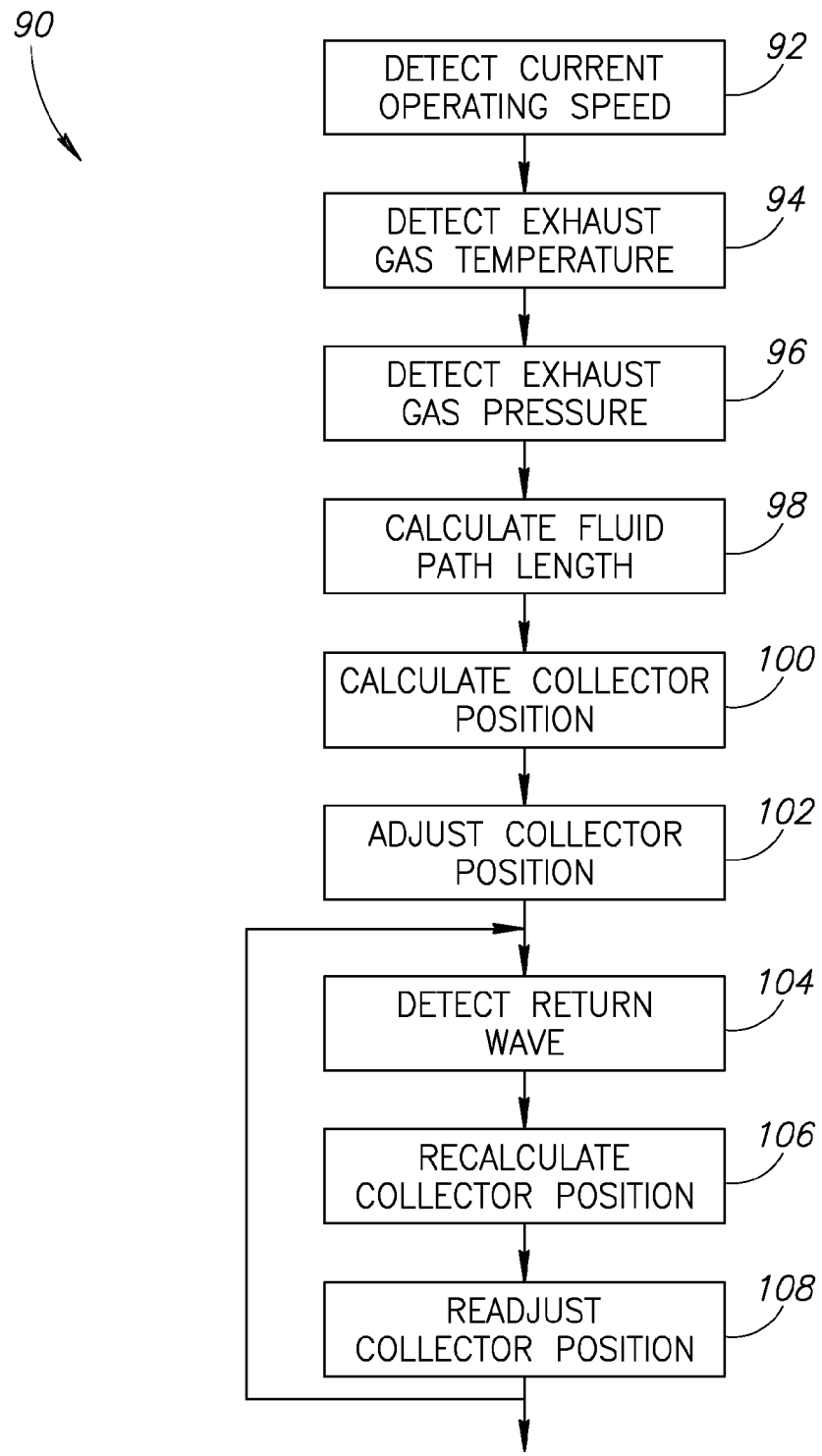
FIG. 6 is a process flow diagram of a method for tuning an exhaust system, in accordance with an embodiment of the present invention.

Referring to FIG. 6, a method 90 for tuning an engine exhaust system may include detecting 92 the current operating speed of the engine. The exhaust gas temperature may also be optionally detected 94. The exhaust gas pressure may also be optionally detected 96. A fluid path length providing proper return wave timing is then calculated 98, based on the operating speed detected in step 92 and optionally based on the exhaust gas temperature and exhaust gas pressure detected in steps 94 and 96. Calculation 98 may include applying an equation to operating conditions or consulting a map containing a mathematically or experimentally determined fluid path length or slider position providing desired performance at a given operating condition, such as RPM. The collector position corresponding to the length calculated in step 92 is then calculated 100 and the position of the collector 18 adjusted 102 to the calculated position.

The method 90 may optionally include detecting 104 arrival of the return wave, and recalculating 106 the collector position if the return wave arrives early or late. The collector position is then readjusted 108. The steps 104, 106, and 108 may be repeated multiple times for a single iteration of the method 90.

Figure 7:
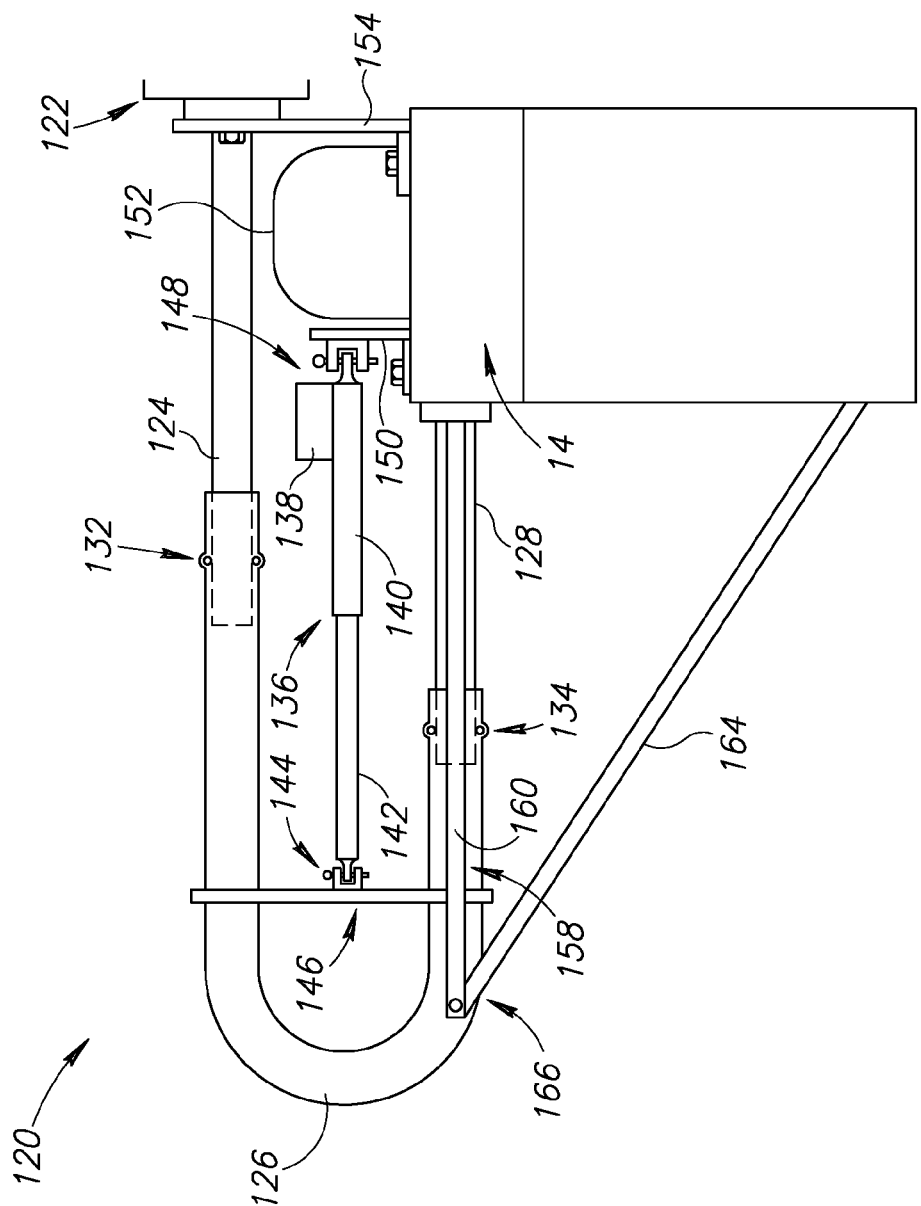
FIG. 7 is side elevation view of an intake tuning system, in accordance with an embodiment of the present invention.

Referring to FIG. 7, an intake tuning system 120 includes a throttle 122 controlling flow of air into a throttle tube 124. A sliding member 126 engages the throttle tube 124 and an intake tube 128 to create a fluid path from the throttle 122 to the intake port of the engine 14. In the illustrated embodiment, the sliding member is U-shaped. The U-shaped configuration enables translation of the sliding member 126 to change the length of the fluid path between the throttle 122 and the intake port. The U-shaped configuration further causes displacement of the sliding member to result in a change in the fluid path length equal to twice the amount of the displacement. A sealing member 132 creates a sliding seal between the throttle tube 124 and the sliding member 126. A sealing member 134 creates a sliding seal between the sliding member 126 and the intake tube 128.

An actuator 136 engages the sliding member 126 to adjust the length of the fluid path between the throttle 122 and the engine 14. A controller 138 may be coupled to the actuator and meter power supplied to the actuator 136 to achieve a desired change in position of the sliding member 126. In the illustrated embodiment, the actuator 136 is a ball-screw, hydraulic, or pneumatic cylinder 140 and piston 142 coupled to the sliding member 126 to cause translation thereof. A first end 146 of the cylinder 140 and piston 142 combination may engage the sliding member 126 by means of a cross member 144 extending between the legs of the U-shaped sliding member 126. Alternatively, the first end 146 secures directly to the sliding member 126.

A second end 148 of the cylinder 140 and piston 142 combination secures to the engine 14, such as to the head or block of the engine. In the illustrated embodiment, the second end 148 secures to the head of the engine 14 between the throttle tube 124 and intake tube 128. The second end 148 may secure to a bracket 150 secured to the head of the engine 14 proximate a valve cover 152. The throttle 122 or the throttle tube 124 may likewise secure to a bracket 154 secured to the head of the engine 14.

Figure 8:
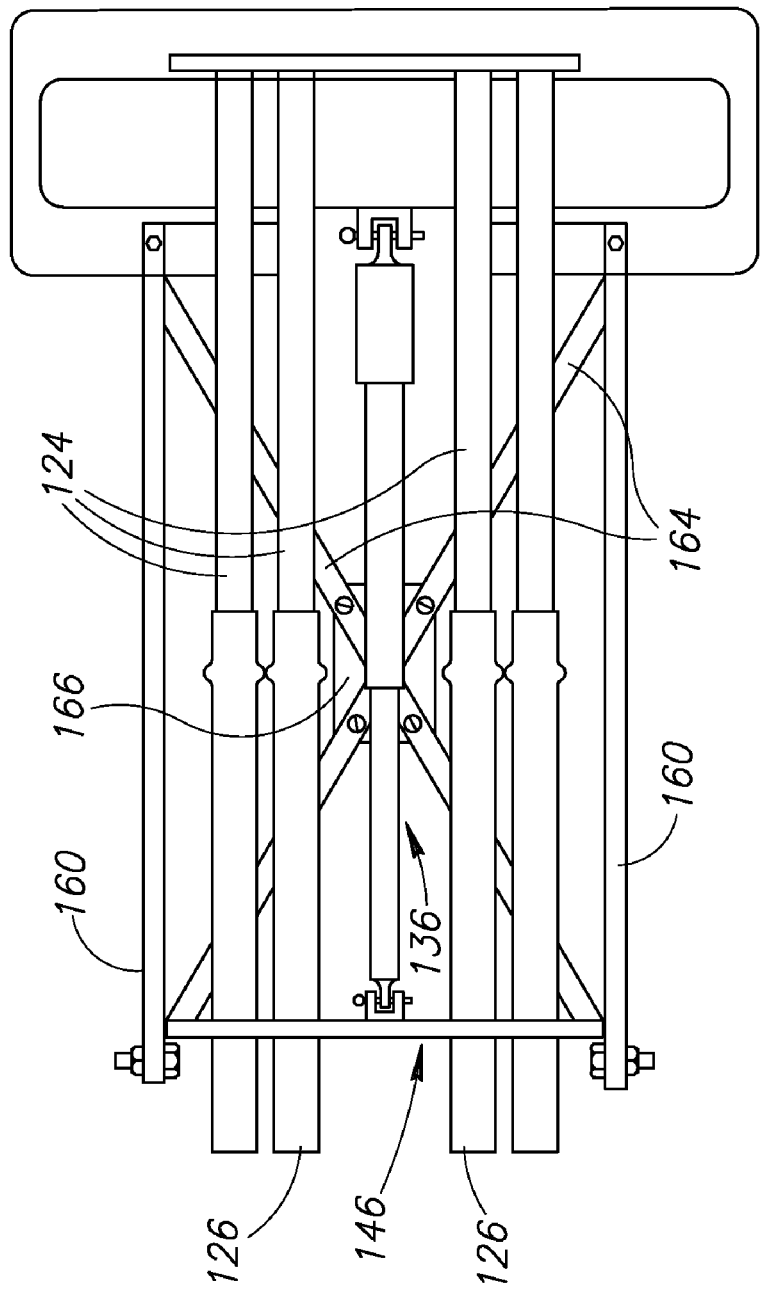
FIG. 8 is a top plan view of an intake tuning system, in accordance with an embodiment of the present invention.

Referring to FIGS. 8 and 9, an engine may include multiple throttle tubes 124, sliding members 126, and intake tubes 128 coupled to the engine's multiple intake ports. In such embodiments, a cross member 146 may be embodied as a plate 156 having multiple apertures 158 formed therein for receiving the arms of the U-shaped sliding members 126.

The sliding member 126 may engage a guide 158 to ensure smooth changes in sliding member position. In the illustrated embodiment, the guide 158 is two grooved rails 160 extending parallel to the intake tubes 128. Struts 164 supporting the rails 160 secure to the block of the engine 14, or other structure within an engine compartment. In the illustrated embodiment, the struts 164 extend from a free end 166 of the rails 160 to the engine 14. The struts 164 may be arranged in the crossed configuration of FIG. 8 having a gusset 166 securing the struts 164 to one another near the intersection point. The rails 160 engage keys 168 secured to the sliding member 126 or cross member 144. In some embodiments, the guide 158 secures to the sliding member 126 whereas the keys 162 are fixed relative to the engine 14.

Referring to FIG. 10, in some embodiments, an intermediate pipe 174 slidably engages the sliding member 126 and the throttle tube 124. The intermediate pipe 174 enables a broader range of fluid path lengths inasmuch as the intermediate pipe 174 slides within either the sliding member 126 or the throttle tube 124 for shorter fluid path lengths. A second sealing member 176 slidably seals the intermediate member with respect to the throttle tube 124.

Figure 11:
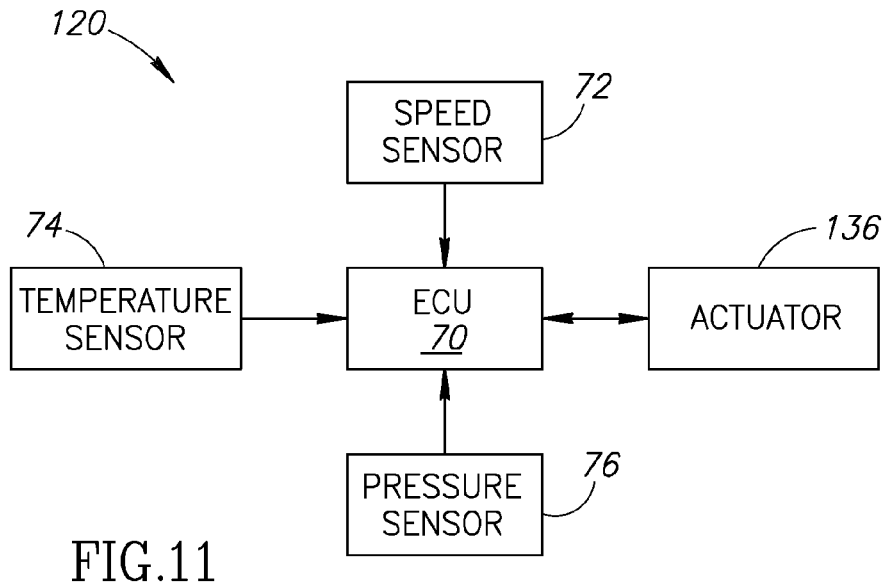
FIG. 11 is a schematic block diagram of an intake tuning system, in accordance with an embodiment of the present invention.

Referring to FIG. 11, an intake tuning system 120 includes an engine control unit 70. The engine control unit 70 receives inputs from sensor such as an operating speed sensor 72, temperature sensor 74, pressure sensor 76, and the like. The ECU 70 provides an output to the actuator 136 or the controller 128 of the actuator 136. The ECU 70 may also receive feed back from the actuator 136 regarding the current position of the collector sliding member 126.

The ECU 70 determines, based on the inputs received, a sliding member position suitable for coordinating pressure waves within the intake tuning system 120 with opening and closing of the intake ports. The ECU 70 may monitor the inputs and make substantially constant or regularly periodic adjustments to sliding member position. Alternatively, the ECU 70 may adjust the sliding member position only upon detection of a change in one or more of the inputs exceeding a specific threshold. The threshold may be proportional or otherwise related to operating speed or another parameter. The ECU 70 may map sliding member positions to specific values, or combinations of values, of one or more parameters such as operating speed, exhaust temperature, intake pressure and the like. In one embodiment, only operating speed is used. In other embodiments, changes in the speed of the waves due to temperature and pressure changes may be accommodated by mapping collector positions to values for operating speed, temperature, and/or pressure. Some engines may vary the timing of valve opening and closing relative to crankshaft position according to operating speed, load on the engine, and other parameters. Accordingly, the ECU 70 may adjust the sliding member position to coincide with these variations.

Mapping may be accomplished by various means. In one embodiment, tables map values, or ranges of values, of inputs to the ECU 70 to sliding member positions. In other embodiments, the ECU 70 accomplishes mapping according to a mathematical formula. In still other embodiments, the ECU 70 accomplishes mapping according to a plurality of mathematical formulae each corresponding to a range of input values for one or more inputs. Mathematical formulae and maps are typically generated by testing of a particular engine to determine which sliding member position provide the highest performance gains for a particular operating speed. In some instances, particular combinations of sliding member position and collector position provide better performance for a particular operating speed than others. Accordingly, testing to determine mathematical formulae and maps may include identifying such combinations and developing maps and formulae to achieve them during engine operation.

In some embodiments, calculated values for sliding member position may be adjusted based on tracking of the intake gas pressure at the intake port. For example, where tracking of intake pressure shows that a return wave is arriving early or late, the ECU 70 may adjust the sliding member position to lengthen or shorten, respectively, fluid path length. In still other embodiments, feedback of intake pressure is the only means used to determine sliding member position. The ECU 70, for example, may determine whether the return wave is arriving early or late and adjust the sliding member position to lengthen or shorten, respectively, the length of the fluid path from the engine 14 to the throttle 122. The ECU 70 may sample the arrival time of the return waves and adjust sliding member position substantially continuously or periodically in order to cause the sliding member position to track changes in engine operating speed.

Figure 12:
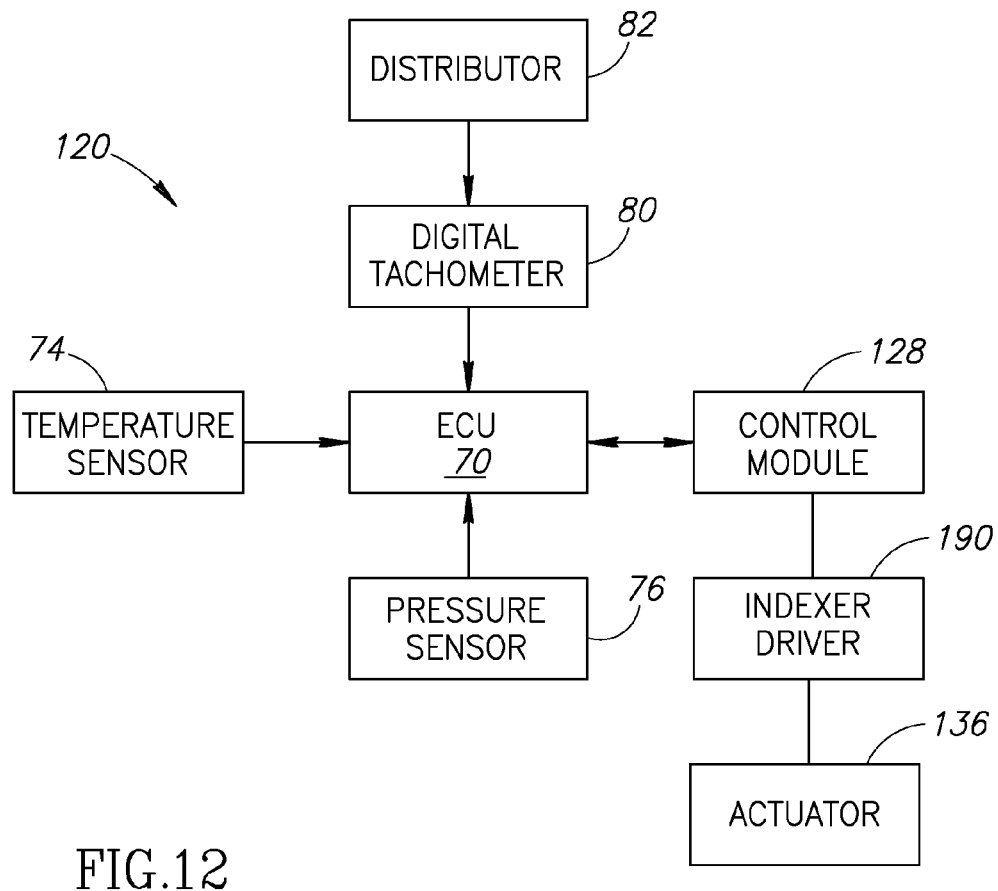
FIG. 12 is a schematic block diagram of an alternative embodiment of an intake tuning system, in accordance with an embodiment of the present invention.

Referring to FIG. 12, in one embodiment, the operating speed of the engine is measured by a digital tachometer 80 coupled to the distributor 82 of the engine. The output of the digital tachometer 80 is input to the ECU 70. The ECU 70 calculates a desired fluid path length or sliding member position as described above. The ECU 70 may provide an output to a control module 128 coupled to an indexer driver 190 driving the actuator 136. The control module 128 refines the output of the ECU 70 to produce an output signal to the indexer driver 190. The control module 128 translates a position, change in position, or fluid path length from the ECU 70 into signals provided to the indexer driver 190 effective to achieve the desired change in position.

Figure 13:
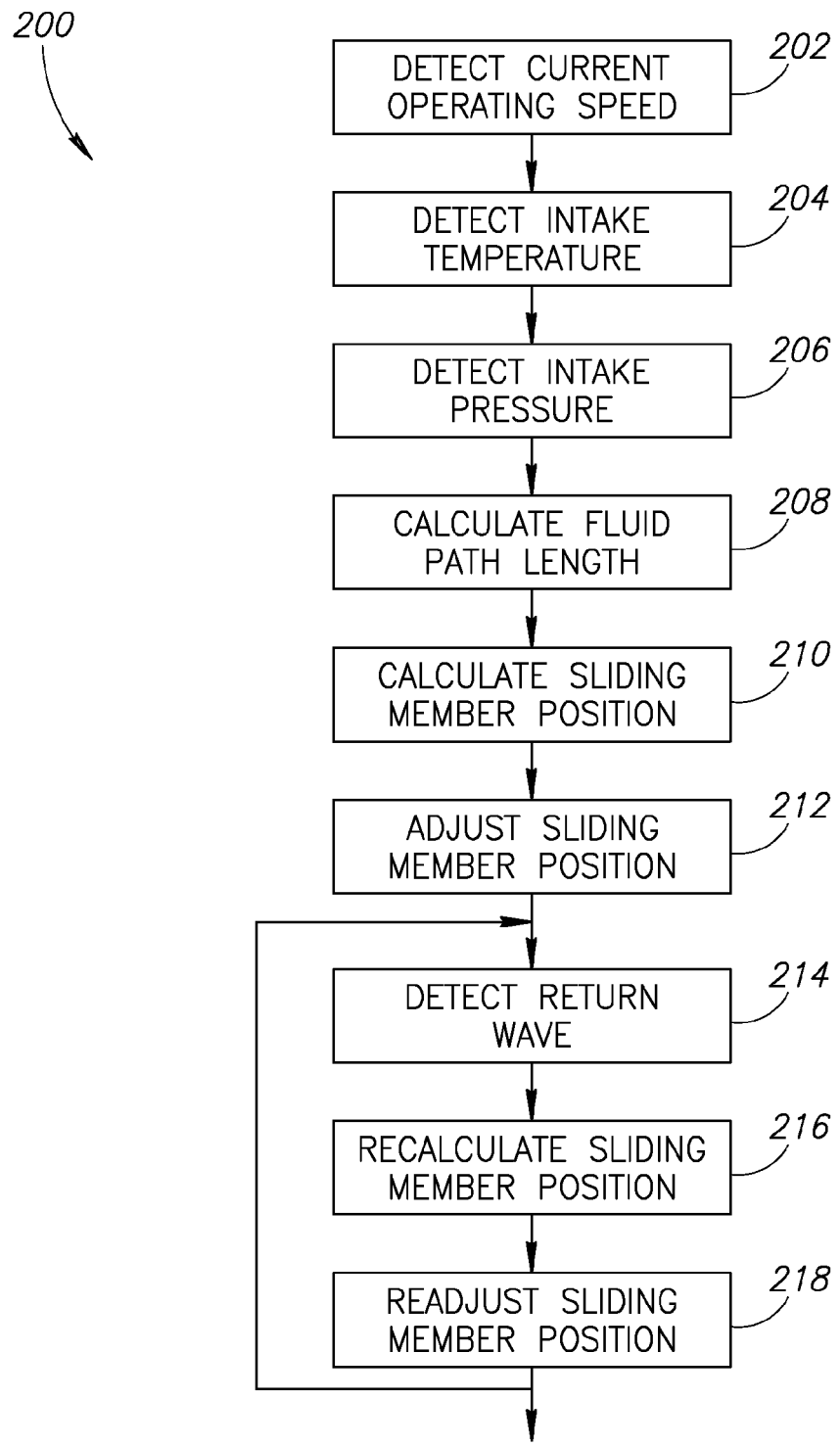
FIG. 13 is a process flow diagram of a method for tuning an intake system, in accordance with an embodiment of the present invention.

Referring to FIG. 13, a method 200 for tuning an engine exhaust system may include detecting 202 the current operating speed of the engine. The intake temperature may also be optionally detected 204. The intake pressure may also be optionally detected 206. A fluid path length providing proper return wave timing is then calculated 208, based on the operating speed detected in step 202 and optionally based on the intake temperature and intake pressure detected in steps 204 and 206. The sliding member position corresponding to the length calculated in step 202 is then calculated 210 and the position of the collector 18 adjusted 212 to the calculated position.

The method 200 may optionally include detecting 214 arrival of the return wave, and recalculating 216 the sliding member position if the return wave arrives early or late. The sliding member position is then readjusted 218. The steps 214, 216, and 218 may be repeated multiple times for a single iteration of the method 200.

The exhaust tuning system 10 and intake tuning system 120 and associated methods may be used to achieve a variety of objectives by controlling the timing of returning positive and negative waves. For example, the timing may be controlled to prevent reversion, in which exhaust gasses escape into the atmosphere through the intake or exhaust runners.

Timing may also be controlled to help the cylinder to achieve a higher percentage of volumetric efficiency by drawing in air during the valve overlap period, and then forcing an additional volume of air (or air-fuel mixture for carbureted engines) into the cylinder at the end of the intake cycle. In the intake-exhaust cycles, beginning with exhaust valve open (EVO), a positive pressure wave is generated when the exhaust valve opens and bow-down is in progress. If the length of the exhaust runner is correct for the RPM, then that wave will return to the cylinder as a negative pressure wave from the open end of the exhaust runner during the intake-exhaust valve overlap period to prevent reversion, draw off residual exhaust gas, and start the inflow of air by means of lowered cylinder pressure.

After the overlap period, the action of the piston moving down the cylinder and drawing in a fresh charge generates a strong suction wave. This wave is then reflected off the open end of the intake runner as a compression wave. If the intake runner is tuned to the proper length for a given RPM, the returning compression wave will force an additional charge of air into the cylinder just before the intake valve closes. This increases cylinder pressure and volumetric efficiency, and therefore torque. At the same time, reversion through the intake system is prevented by maintaining positive pressure at the intake port until the exhaust valve closes. The wave generated at intake valve close (IVC) will echo several times and will have become weaker by the time intake valve open (IVO) occurs. However, it appears to nonetheless provide a significant improvement.

The above benefits obtained by the tuning systems 10, 120 have particularly beneficial application in the field of lean-burn technology, in which emissions are reduced by using an extremely lean fuel/air mixture. This approach reduces the formation of Nitrous Oxides by reducing the temperature of combustion. Increasing cylinder pressure at IVC serves to increase the amount of fuel that can be added while still maintaining a high air/fuel ratio.

An engine may be dynamically tuned using one or both of the exhaust tuning system 10 and intake tuning system 120 to achieve all or part of these benefits. In addition to the methods described above, dynamic tuning may be accomplished by consulting an empirically derived map or curve fit of tuning system configurations and engine operating conditions. For example, incremental positions of a slider 126 and collector 18 may be mapped to one or more RPMs. In operation, a controller consults the map and sets the slider 126 and collector position to the position mapped to the present operating speed of the engine. Mappings may map tuning systems 10, 120 positions to multiple variables in addition to RPM such as throttle position, engine temperature, throttle position, and the like. Maps may be derived by connecting an engine or vehicle to a dynamometer and experimenting with tuning systems 10, 120 positions to determine which provides a preferred performance characteristic such as fuel efficiency, torque, horsepower, or the like.

Figure 14:
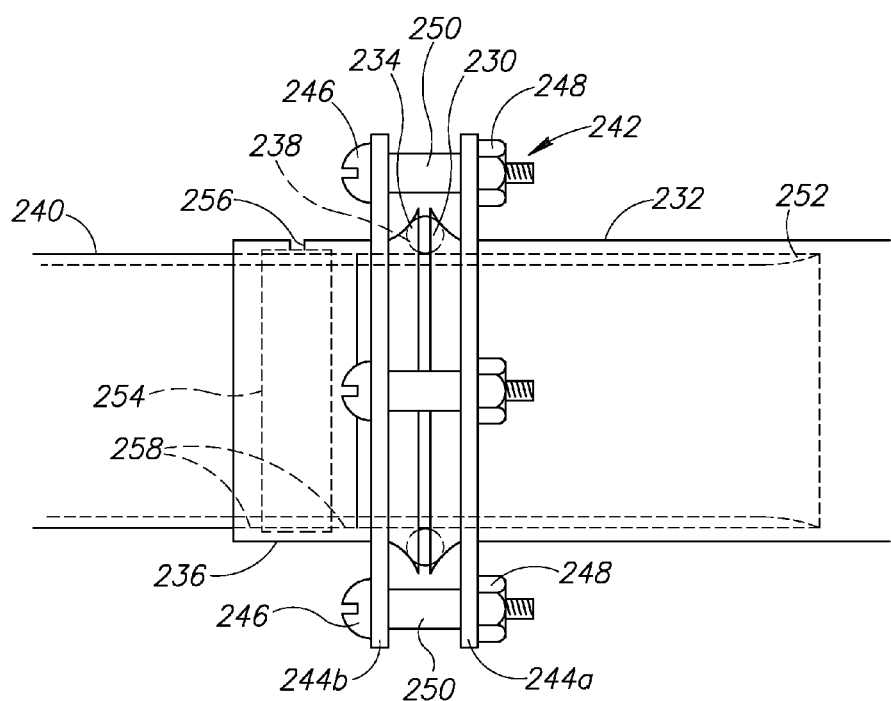
FIG. 14 is a side cross-sectional view of a sealing member, in accordance with an embodiment of the present invention.

The sealing members 20, 22, 132, 134, and 176 may be embodied as illustrated in FIG. 14. A flange 230 is formed on an outer tube 232. A second flange 234 is formed on an extension 236. The flanges 230, 234 capture an o-ring 238 encircling an inner tube 240. The outer tube 232 and inner tube 240 may be any tube forming part of the exhaust tuning system 10 or intake tuning system 120, such as the upstream tubes 12, downstream tube 16, inlet tubes 28, outlet tube 32, throttle tube 134, sliding member 136, intake tube 128, or intermediate tube 174.

A retainer 242 maintains the flanges 230, 234 over the o-ring 238. The retainer 242 may force the flanges 230, 234 together to the extent that the o-ring 238 is pressed against the inner tube 240. In one embodiment, the retainer 242 is embodied as rings 244a, 244b abutting the flanges 230, 234, respectively. Fasteners, such as bolts 246 and nuts 248 may force the rings 244a, 244b together. In some embodiments, spacers 250 maintain a minimum separation between the rings 244a, 244b. The inner tube 240 may have a spacer 252 at an end thereof positioned within the outer tube 232. The spacer 252 may serve to reduce movement of the inner tube 240 within the outer tube 232 despite the difference in the diameters thereof and prevent complete removal of the inner tube 240 from the outer tube 232. The spacer 252 may also provide a partial seal between the outer tube 232 and the inner tube 240.

A felt ring 254 may be positioned between the extension 236 and the inner tube 240. The felt ring 254 serves to reduce the amount of contaminants reaching the o-ring 238. The felt ring 254 may also carry lubricant, which is deposited on the inner tube 240. An aperture 256, or zert, may be provided adjacent the felt ring 254 to facilitate application of lubricant thereto. Internal lands 258 formed in the extension 236 retain the felt ring 254.

Figure 15:
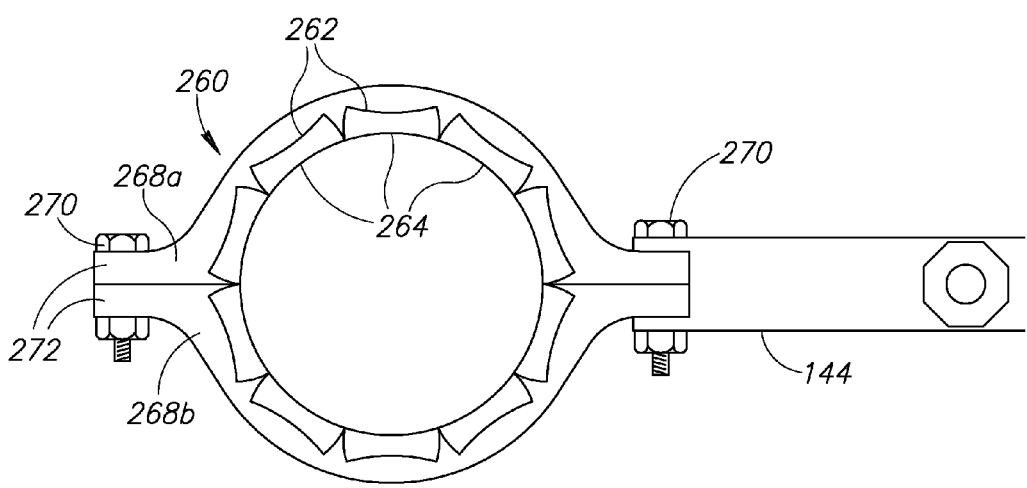
FIG. 15 is an end cross-sectional view of an alternative embodiment of a sealing member, in accordance with an embodiment of the present invention.
Figure 16:
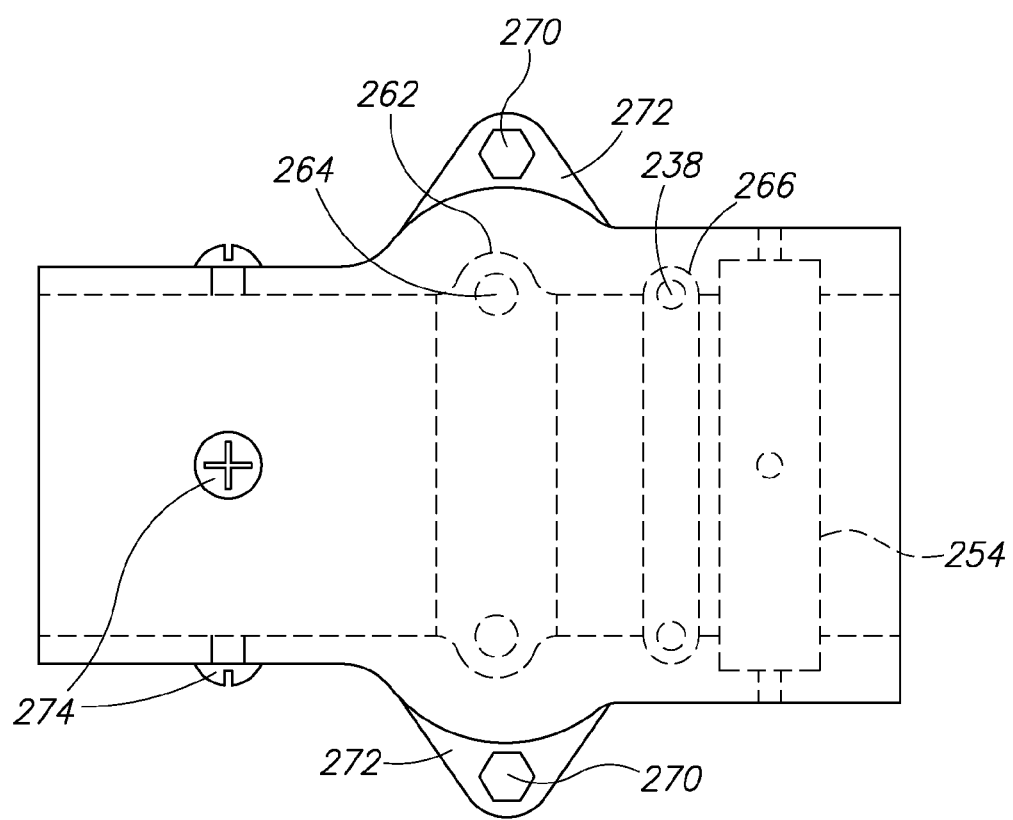
FIG. 16 is a side cross sectional view of a bearing seal for use in the sealing member of FIG. 15, in accordance with an embodiment of the present invention.

Referring to FIGS. 15 and 16, the sealing members 20, 22, 132, 134, and 176 may include a bearing seal 260 in addition to a seal, such as the polymer o-ring 238. The bearing seal 260 may include a plurality of races 262 receiving roller bearings 264. The bearing surfaces of the roller bearings 264 have a concave portion having a radius substantially matching that of the inner tube 240. The races 262 have a convex bearing surface substantially conforming to that of the bearings 264. In the embodiment of FIGS. 15 and 16, the o-ring 238 is positioned within a groove 266 formed in the outer tube 232.

The embodiment of FIGS. 15 and 16 may be formed as separable sections 268a, 268b securable to one another by fasteners 270 engaging flanges 272 formed on the sections 268a, 2686b. Set screws 274, or like fastening means, secure sections 268a, 268b to the outer tube 232 or inner tube 240. In some embodiments, the cross member 144 is secured by a fastener 270 to the sections 268a, 268b.

Figure 17:
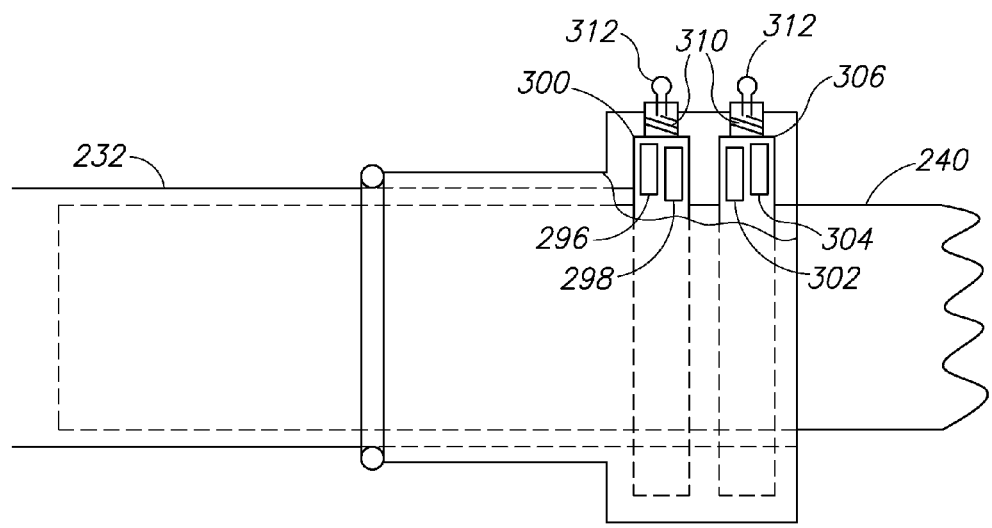
FIG. 17 is a side cross sectional view of another alternative embodiment of a sealing member, in accordance with an embodiment of the present invention.

Referring to FIG. 17, in an alternative embodiment, the sealing members 20, 22, 132, 134, and 176 include rigid rings 296, 298 seated within a groove 300 formed in the outer tube 232 or a member secured to the outer tube 232. One of the rings 296, 298 has an undeformed inner diameter slightly smaller than the inner tube 240 such that the ring 296, 298 elastically retains itself around the tube 240 to create a seal. The other of the rings 296, 298 has an undeformed outer diameter slightly larger than the inside diameter of the groove 300 such that it elastically retains itself within the groove 300 to create a seal.

In some embodiments, an additional set of rings 302, 304 is provided within a groove 306. In one embodiment, rings 296 and 304 have an undeformed outer diameter slightly larger than their respective grooves 300, 306, whereas rings 198, 302 have undeformed inner diameters slightly smaller than the outer diameter of the inner tube 240. In this manner, as the inner tube 240 slides within the outer tube 232, at least one set of rings will be forced against one another to enhance sealing.

The rings 296, 298 may each have a gap 308 formed therein. The gap 308 facilitates deformation of the rings 296, 298, 302, 304 when positioning them into their respective grooves 300, 306 and around the inner tube 240. The gaps 308 of the rings 296, 298, 302, 304 are offset from one another to hinder leakage of gases therethrough. An aperture 310 may extend through the outer tube 232 to facilitate injection of lubricant over the rings 296, 298. A set screw 312 is threaded into the aperture 310 during operation to seal the aperture 310.

Figure 18:
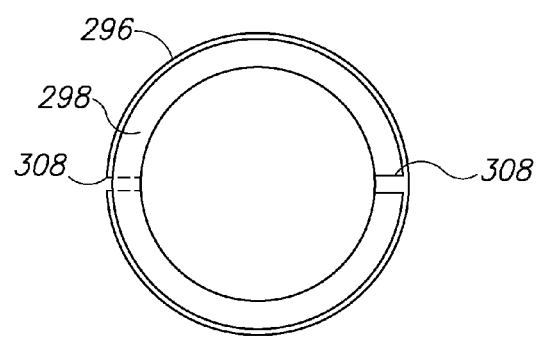
FIG. 18 is a front elevation view of sealing rings suitable for use in the sealing member of FIG. 17, in accordance with an embodiment of the present invention.
Figure 19:
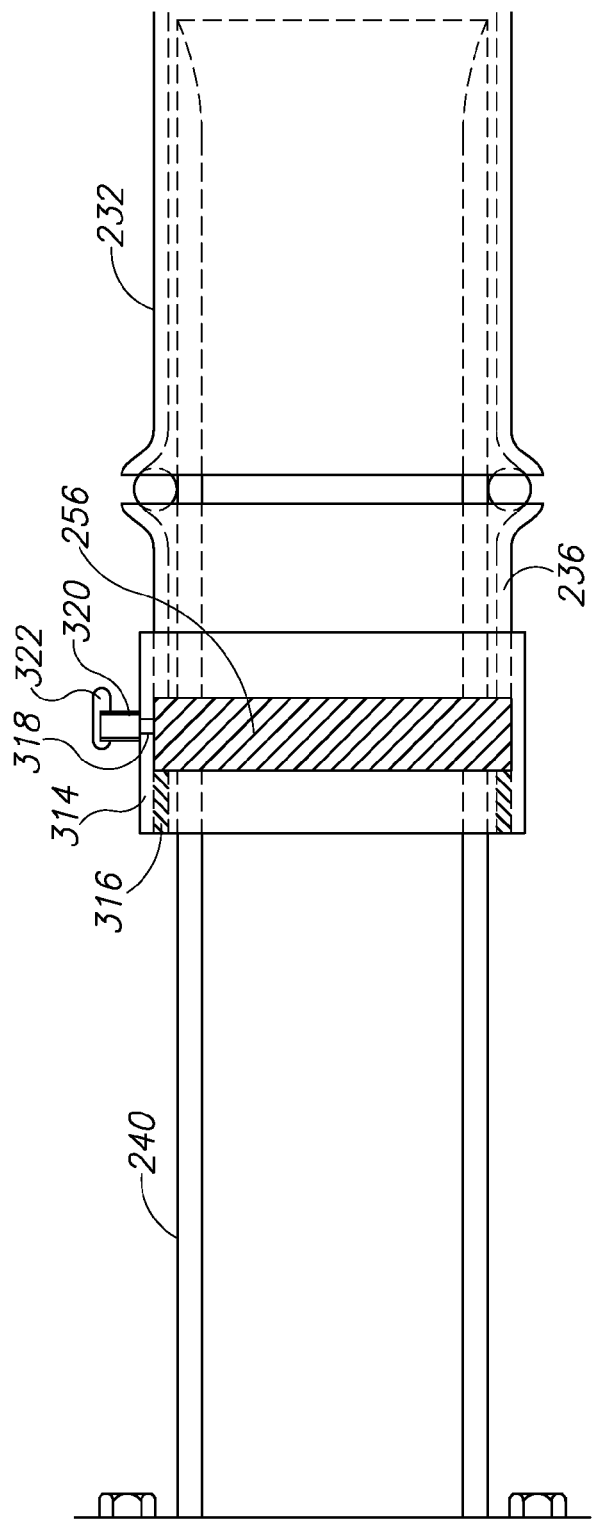
FIG. 19 is a side cross sectional view of yet another alternative embodiment of a sealing member, in accordance with an embodiment of the present invention.

Referring to FIG. 19, in an alternative embodiment of the sealing member of FIG. 18, lubrication for one or more of the sealing members 20, 22, 132, 134, and 176 is provided by a felt ring 256 positioned within an outer ring 314. An inner ring 316 secures to the outer ring 314, effectively capturing the felt ring 256 between the inner ring 316 and the extension 236. An aperture 318 is formed in the outer ring 314 to permit the injection of oil onto the felt ring. An oil cup 320 may secure to the outer ring 314 over the aperture 318 and bear a cap 322. The cap 322 may be opened to permit filling of the oil cup 320 and then closed to ensure a reservoir of oil is available to soak the felt ring 254. In some embodiments, the outer ring 314, inner ring 316, and extension 236 are secured to one another such as by tack welding, bonding, rivets, or the like. In the embodiment of FIG. 19, the end 324 of the inner tube 240 has an outwardly tapered inner surface to improve fluid flow. The inner tube 240 has an outer diameter such that it is slidable within the outer tube 232 and extension 236. The extension 236 and outer tube 232 are secured to one another in a similar manner to the embodiment of FIG. 19, such as by rings 244a, 244b abutting the flanges 230, 234, respectively. Fasteners, such as bolts 246 and nuts 248 may force the rings 244a, 244b together.

Figure 20:
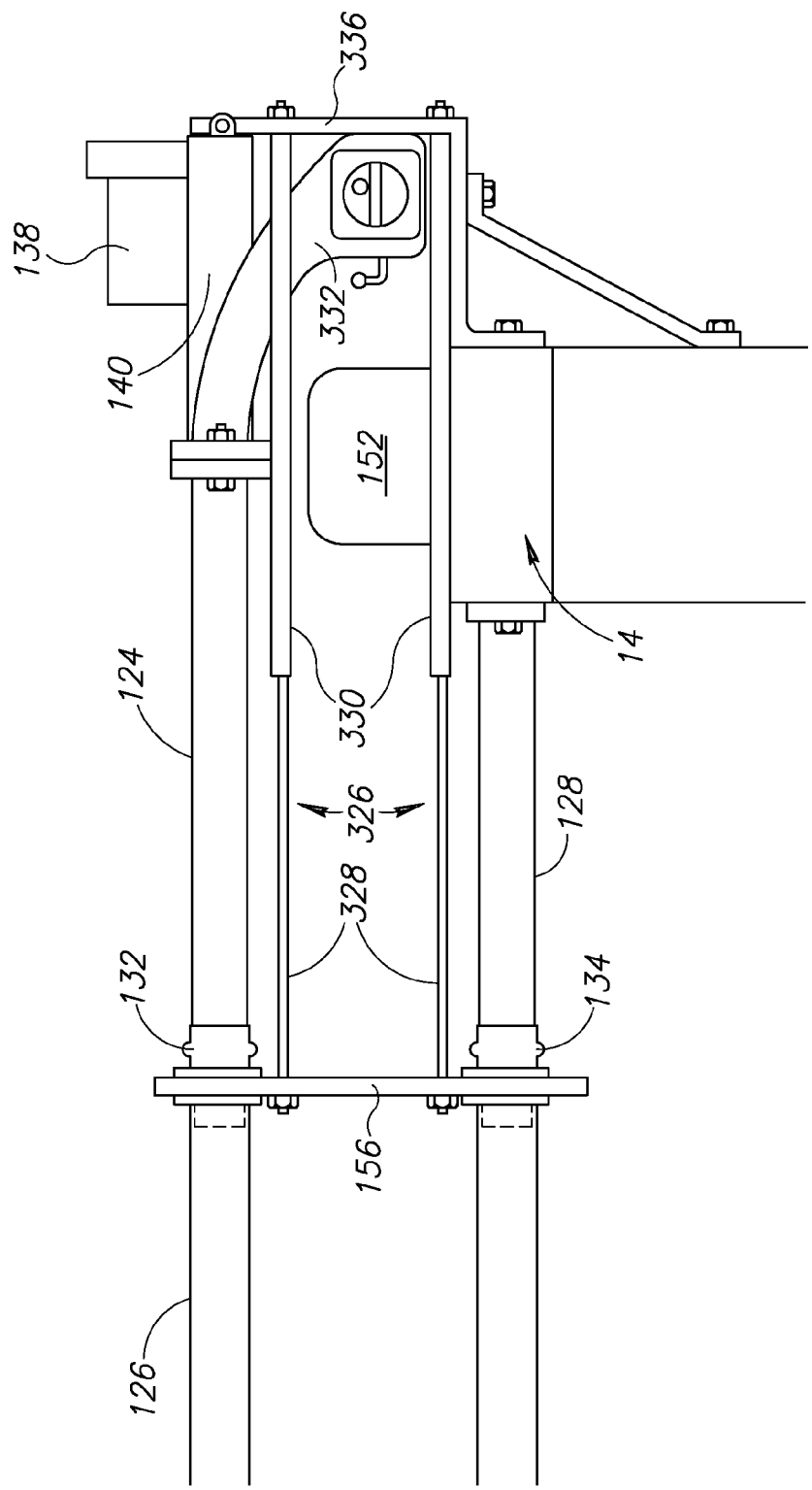
FIG. 20 is side elevation view of an alternative embodiment of an intake tuning system, in accordance with an embodiment of the present invention.
Figure 21:
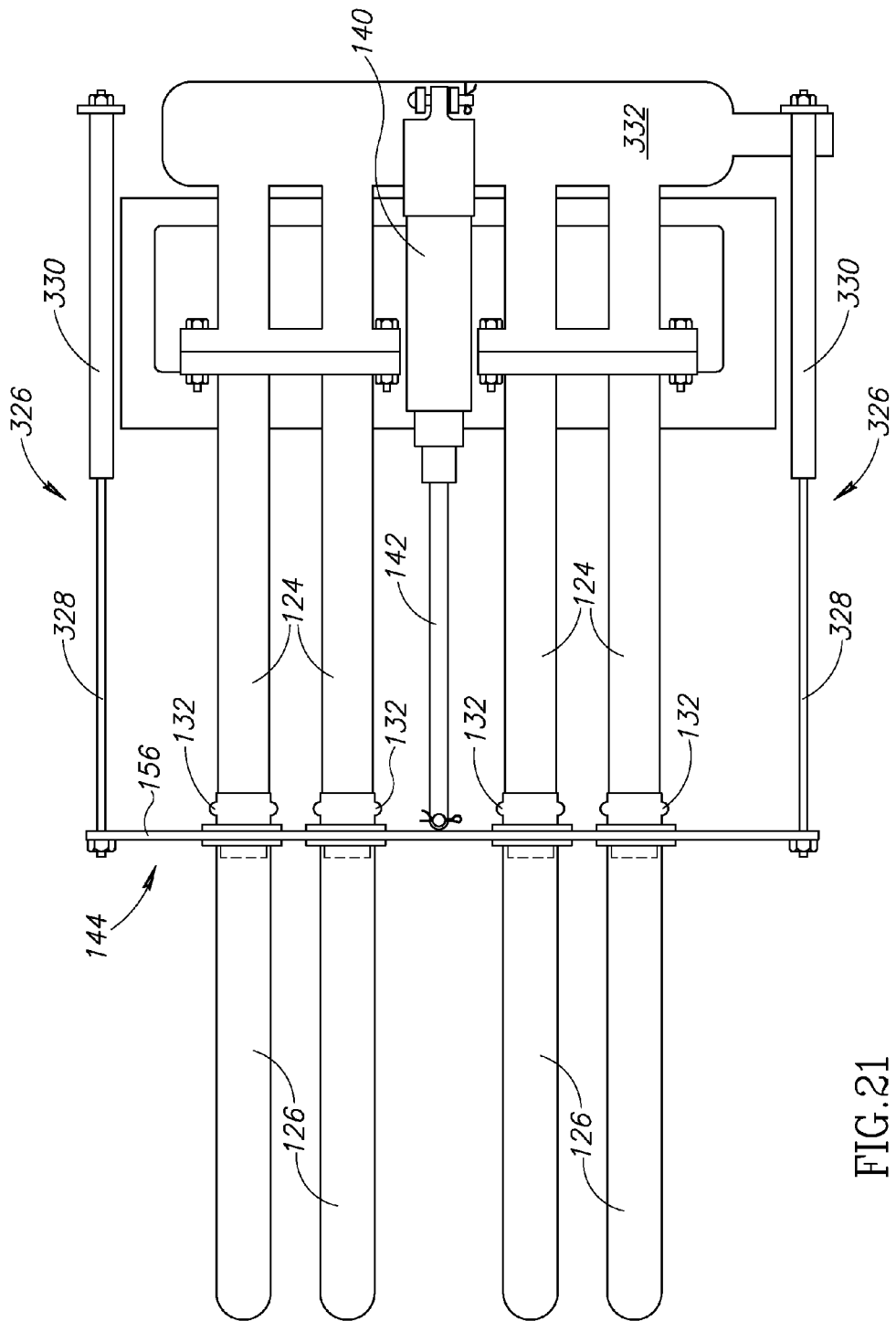
FIG. 21 is a top view of the intake tuning system of FIG. 20.
Figure 22:
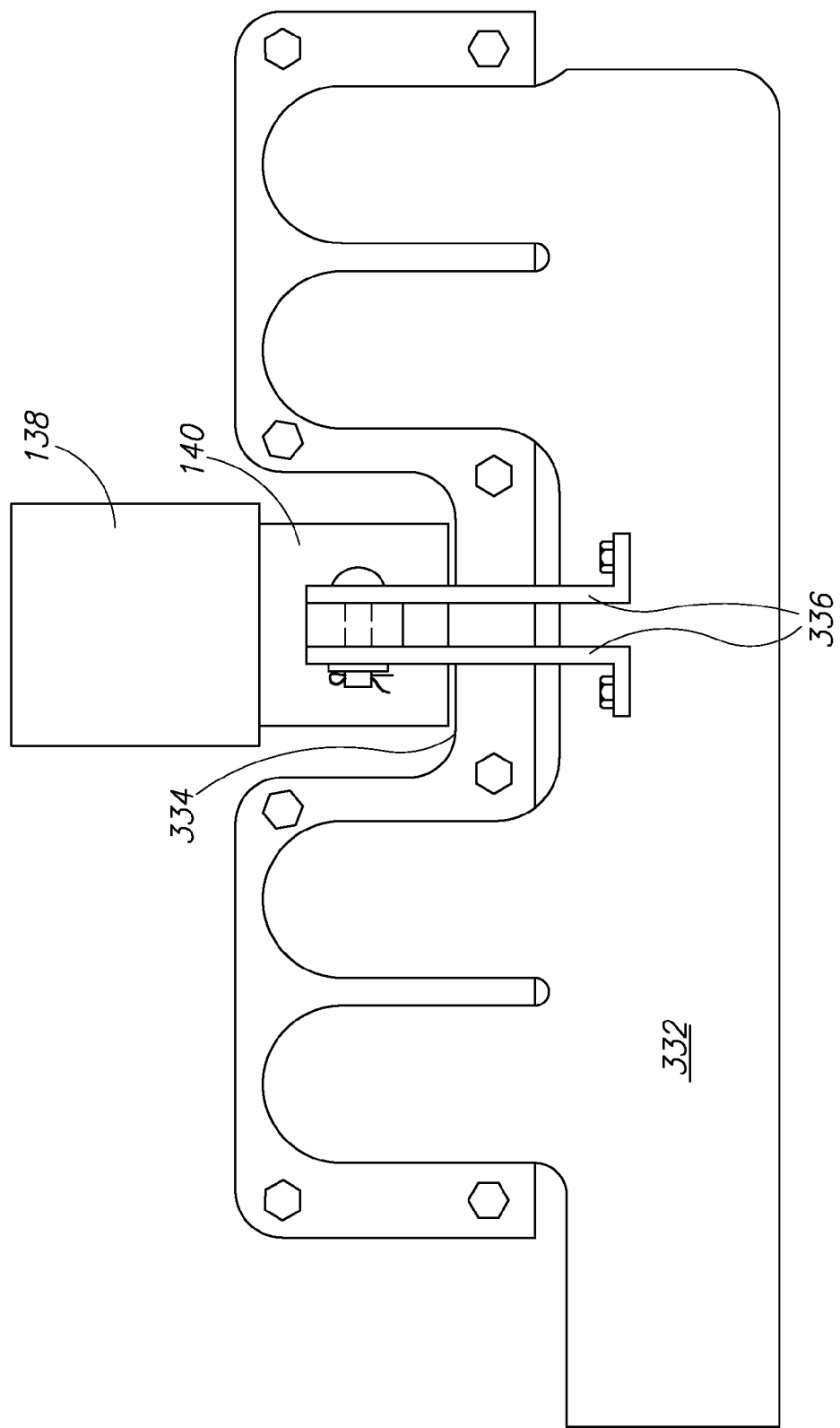
FIG. 22 is a rear view of the intake tuning system of FIG. 20.

Referring to FIGS. 20-22, in an alternative embodiment, the intake tuning system 70 includes one or more dampers 326. The dampers 326 may serve to maintain the plate 156 square relative to the throttle tube 124, sliding members 126, and intake tubes 128. The force of the vacuum exerted on the sliding members 126 may tend to cause the sliding members 126 to skew. The steadying force exerted by the dampers 326 helps to counteract this tendency. In the illustrated embodiment, four dampers 326 are used proximate the four corners of the plate 156 vertically between the legs of the sliding members 126 and located laterally on either side of the sliding members 126.

In the illustrated embodiment, the dampers 326 are embodied as pistons 328 and cylinders 330. The cylinders 330 may be spring loaded such that the pistons 328 are biased outwardly. Alternatively, the cylinders 330 may contain hydraulic fluid, or other means, exerting frictional force on the pistons 328 such that movement is resisted. In yet another alternative, the cylinders 330 both bias the pistons 328 outwardly and exert frictional force.

In the embodiment of FIGS. 20-22, the plate 156 secures to the sliding members 126 proximate the sealing members 132. The plate 156 may secure directly to the sliding members 126 or the sealing members 132, 134. The sliding members 126 or the sealing members 132 secure to the plate 156 by means of welds, bolts, or like fastening means. For sealing members 132, 134 embodied as illustrated in FIGS. 14 and 19, the plate 156 may secure to the outer ring 314, extension 236, or rings 244a, 244b.

The cylinder 140 and piston 142, in the illustrated embodiment, are positioned between the throttle tubes 124. The intake manifold 332 securing to the throttle tubes 124 may have a gap 334 formed thereon suitable for receiving the cylinder 140. A mounting bracket 336 may likewise be positioned within the gap 334. The cylinder 140 may mount to the manifold 332.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An intake tuning system comprising:
   an upstream tube;
   a downstream tube in fluid communication with an intake port of an engine;
   an adjustment tube adjustably connected to the upstream tube and downstream tube and adjustable with respect thereto to change the fluid path length of the combined upstream tube, adjustment tube, and downstream tube; and
   an actuator coupled to the adjustment tube to selectively move the adjustment tube relative to the upstream and downstream tubes, the actuator located between the upstream and downstream tubes, the actuator having a first end coupled to the adjustment tube and a second end coupled to a portion of an engine;
   a sensor adapted to sense an operating parameter of the engine and to produce an output corresponding to the operating parameter;
   a control unit electrically coupled to the output of the sensor and the actuator, the control unit programmed to activate the actuator in response to a change in the output of the sensor,
   wherein the upstream tube and downstream tube each comprise a straight portion, the straight portions being parallel to one another and the adjustment tube being connected to the straight portions,
   wherein the adjustment tube is U-shaped; and
   a plurality of upstream tubes, adjustment tubes and downstream tubes, each adjustment tube connected to one of the plurality of upstream tubes and one of the plurality of downstream tubes;
   a cross member comprising a plurality of apertures, the adjustment tube mounting within the apertures and the actuator being coupled directly to the cross member.

2. The intake tuning system of claim 1, further comprising upstream sealing members engaging the upstream tubes and the adjustment tube to create a seal therebetween and downstream sealing members engaging the downstream tubes and the adjustment tube to create a seal therebetween.

3. The intake tuning system of claim 1, where sensing a change in an operating condition of the engine comprises sensing a change in operating speed of the engine.

* * * * *

UNITED STATES PATENT AND TRADEMARK OFFICE
CERTIFICATE OF CORRECTION

PATENT NO. : 7,650,867 B2　　　　　　　　　　　　　　　　　　　　　Page 1 of 1
APPLICATION NO. : 11/382910
DATED : January 26, 2010
INVENTOR(S) : Allan R. Williams It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 561 days.

Signed and Sealed this

Twenty-eighth Day of December, 2010

David J. Kappos
*Director of the United States Patent and Trademark Office*